Jan. 2, 1940.  R. C. JACOBS  2,185,301
SEAT TRACK AND RISER
Filed Feb. 27, 1937  2 Sheets-Sheet 1
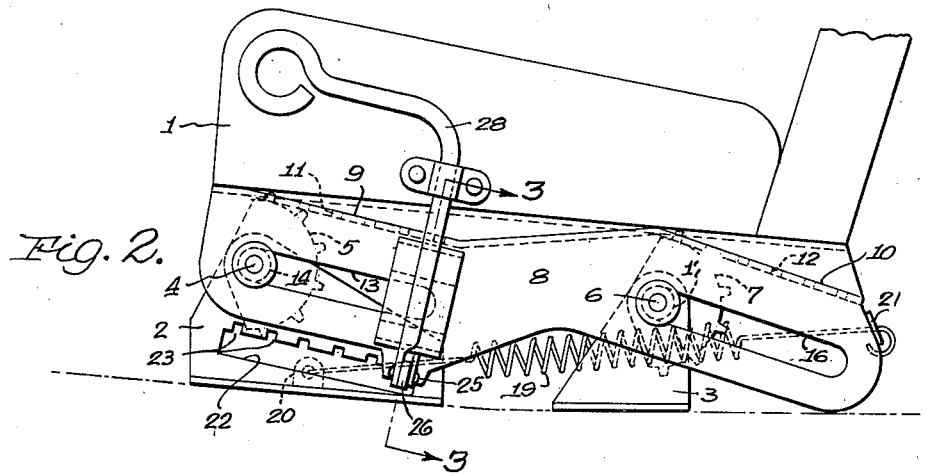
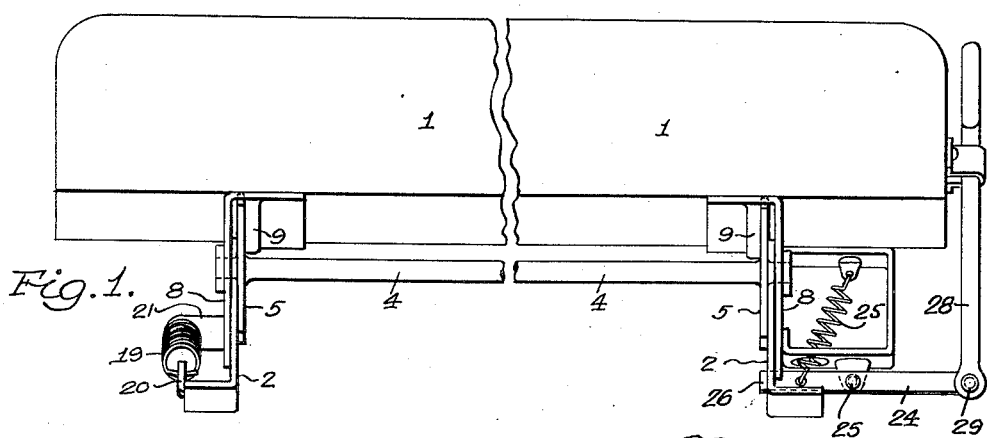
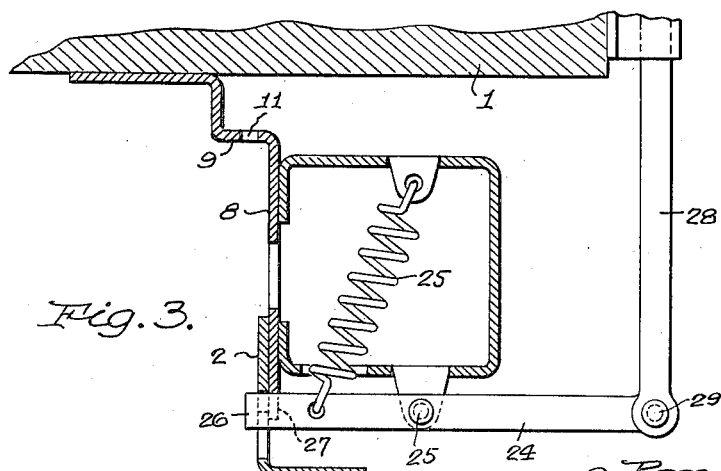
Inventor
Rex C. Jacobs,
By
Attorneys Jan. 2, 1940.  R. C. JACOBS  2,185,301
SEAT TRACK AND RISER
Filed Feb. 27, 1937  2 Sheets-Sheet 2

Inventor
Rex C. Jacobs,
By
Attorneys

Patented Jan. 2, 1940

2,185,301

UNITED STATES PATENT OFFICE 2,185,301

SEAT TRACK AND RISER

Rex C. Jacobs, Detroit, Mich.

Application February 27, 1937, Serial No. 128,246

7 Claims. (Cl. 155—14)

The present invention relates to a novel seat track and riser for supporting the front or driver's seat of an automobile whereby the seat may be adjusted to suit the physical requirements of different drivers.

The primary object of the present invention is to provide a seat track and riser for supporting a seat for adjustment movement, forwardly or rearwardly of a vehicle, and for causing a tilting action incident to the forward and rearward movements. That is, as the seat is moved forwardly the riser mechanism functions to tilt the seat forwardly, and as the seat moves rearwardly, the riser mechanism functions to tilt the seat rearwardly.

Another object of the invention is to provide a seat track and riser for an automobile seat which functions to elevate the seat as it moves forward and to lower the seat as it moves rearwardly. In regard to this function, the riser mechanism is so designed that during forward movement of the seat the rear edge of the seat is elevated more rapidly than the front edge, with the result that the seat is tilted. During rearward movement of the seat, the riser functions to lower the rear edge of the seat more rapidly than the front edge, with the result that the seat is tilted opposite to the direction of the tilting which is incident to forward movement thereof.

Another object of the invention is to provide a seat track and riser embodying a plurality of gear sectors, mounted upon a stationary support, and having rolling contact with track members which are attached to the vehicle seat, and means in combination therewith for maintaining the sectors and tracks in proper relation. In such a combination, the tilting movements referred to above are attained by inclining the tracks.

With the above and other objects in view, the invention consists in matters hereinafter more particularly described with reference to the accompanying drawings, in which:

Figure 1 is a front elevation;

Fig. 2 is a side elevation;

Fig. 3 is a section taken on the line 3—3 of Fig. 2;

Figures 4, 6:
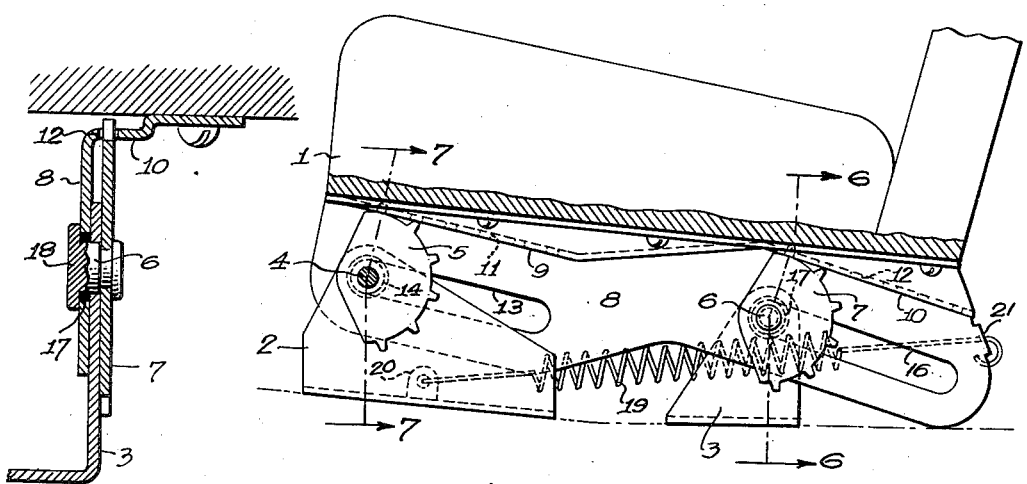
Figure 5:
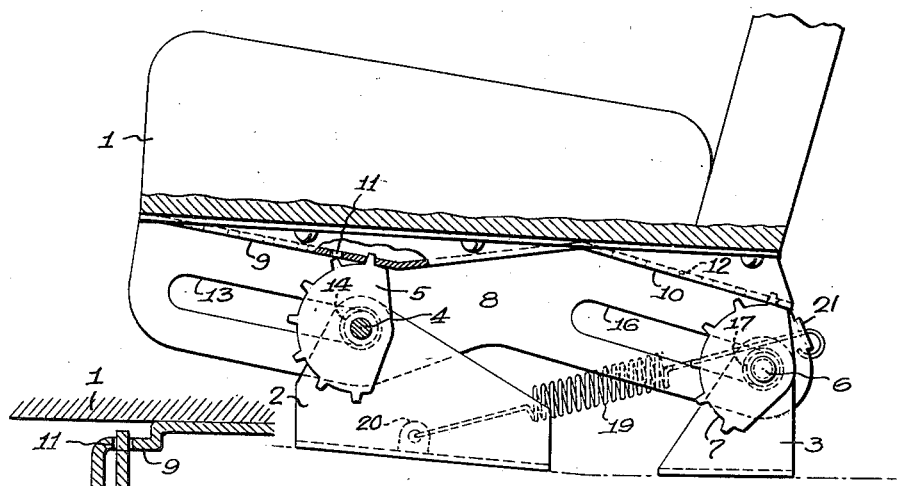
Figure 7:
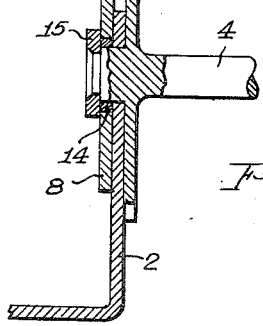

Figs. 4 and 5 are vertical sections illustrating different positions of the art, and Figs. 6 and 7 are sections taken respectively on lines 6—6 and 7—7 of Fig. 4.

Like characters of reference are employed throughout to designate corresponding parts.

Beneath the two front corners of the seat 1 are provided two stationary brackets 2, and beneath the two rear corners of the seat are provided two stationary brackets 3. Rotatably supported by the two brackets 2 is a shaft 4 having two gear sectors 5 integrally formed thereon or secured thereto. Each rear bracket 3 supports a stub shaft 6 upon which a gear sector 7 is mounted.

Secured to the bottom of the seat 1 are brackets 8 having forward inclined tracks 9 and rear inclined tracks 10. The tracks 9 and 10 are provided with apertures 11 and 12, respectively, and constitute racks with which the gear sectors 5 and 7 mesh. As may be readily seen, the inclination of the rear tracks 10 are greater than the inclination of the forward tracks 9.

The brackets 8 have inclined slots 13 adjacent their forward ends, and rollers 14 on the ends of the shaft 4 engage walls of the grooves 13 to maintain the tracks 9 against vertical displacement from the gear sectors 5. Lateral displacement of the tracks 9 from the gear sectors 5 is prevented by providing retainers 15 on the ends of the shaft 4. With the brackets interposed between the gear sectors 5 and adjacent brackets 8, and the retainers 15 in sliding engagement with the outer surfaces of respective brackets 8, lateral displacement of the tracks 9 with respect to the gear sectors 5 is impossible.

Adjacent the rear ends of the brackets 8 are provided inclined slots 16 and rollers 17, on the stub shafts 6, engage walls of the slots 16 to prevent vertical displacement of the tracks 10 from the gear sectors 7. Retainers 18 are provided on the stub shafts 6 and engage the outer surfaces of respective brackets 8 to maintain the brackets 3 interposed between the gear sectors 7 and brackets 8 for the purpose of preventing lateral displacement of the tracks 10 from the gear sectors 7.

It becomes apparent from the foregoing that the seat 1 may be moved forwardly and rearwardly upon the gear sectors 5 and 7. As may be seen upon comparison of Figs. 4 and 5, the inclination of the tracks 9 and 10 causes the seat to be raised during forward movement and lowered during rearward movement. Because the rear tracks 10 have greater inclination than the forward tracks 9 the seat tilts forwardly during forward movement and tilts rearwardly during rearward movement. In order to assist forward movement of the seat, and to yieldably oppose rearward movement, a coiled spring 19 is placed in tension between the stationary bracket 20 and a hook 21 on a bracket 8.

In order to releasably hold the seat at various stages of its forward or rearward movement one of the forward stationary brackets 2 is provided with an inclined slot 22 in which the upper wall has a series of notches 23 for the reception of a latch carried by the seat. The latch is in the form of a rocking lever 24 supported upon a pivot 25 carried by one of the brackets 8. The end 26 of the rocking lever 24 extends through the slot 22 and a spring 25 is connected to this end to normally urge upward movement thereof whereby it tends to enter the notches 23. As may be seen upon reference to Figs. 1 and 3, when the end 26 of the lever 25 is disposed in one of the notches 23 it is also disposed in a notch 27 in the bracket 8 and there is no tendency for the lever to bend under any load which might be imposed upon it. For retracting the end of the lever 25 from the notches 23 a handle 28 is connected to the end 29 thereof. By manually raising the handle 28 the lever 25 may be rocked upon its pivot to withdraw the lever end 26 from any notch it might be in.

From the foregoing it becomes apparent that the seat may be moved forwardly and rearwardly to various positions of adjustment, and that it may be locked in various positions. During such movement forwardly and rearwardly the seat is also tilted, due to the inclination of the tracks 9 and 10. The tracks 9 and 10 are held in proper relation with their respective gear sectors, both against vertical and lateral displacement with respect thereto. Further, by uniting two of the gear sectors, as the shaft 4 unites the gear sectors 5, it becomes impossible for one side of the seat to drag with respect to the other, and it need be locked only at one side.

Although a specific embodiment of the invention has been illustrated and described it will be understood that various changes may be made within the scope of the appended claims without departing from the spirit of the invention, and such changes are contemplated.

What I claim is:

1. A vehicle seat structure comprising, spaced movable track members supporting the seat, said track members having forwardly disposed inclined track portions and rearwardly disposed inclined track portions, said forward and rearward track portions having different inclinations to provide for tilting of the seat on movement of the seat track members, guide slots in said track members adjacent said forward track portions and having substantially the same inclination as said forward track portions, guide slots in said track members adjacent said rearward track portions and having substantially the same inclination as said rearward track portions, stationary supports in the vehicle, rotatable means carried by said stationary supports, said inclined track portions bearing upon said rotatable means, and means on said supports engaging in said slots.

2. A vehicle seat structure comprising laterally spaced movable track members supporting the seat, said track members having forwardly disposed inclined track portions and rearwardly disposed inclined track portions, said forward and rearward track portions having different inclinations to the horizontal to provide for tilting of the seat, stationary supports for said track members, rotatable gears supported by said stationary supports and arranged to mesh with said track portions, forward and rearward slots in said track members inclined respectively to the same angle as said forwardly and rearwardly disposed inclined track portions, and rollers carried by said stationary supports and engaging in said slots.

3. A vehicle seat structure comprising laterally spaced movable track members supporting the seat, said track members having forwardly disposed inclined track portions and rearwardly disposed inclined track portions, said forward and rearward track portions having different inclinations to the horizontal to provide for tilting of the seat, supports for said track members, rotatable gears supported by said supports and arranged to mesh with said track portions, guideways in said track members, rollers carried by said supports and engaging in said guideways, and spring means yieldingly opposing movement of said track members in one direction.

4. A vehicle seat structure comprising laterally spaced movable track members supporting the seat, said track members having forwardly disposed inclined track portions and rearwardly disposed inclined track portions, said forward and rearward track portions having different inclinations to the horizontal to provide for tilting of the seat, stationary supports for said track members, rotatable gears supported by said stationary supports and arranged to mesh with said track portions, forward and rearward guideways inclined respectively to substantially the same angle as said forwardly and rearwardly disposed track portions, rollers carried by said stationary supports and engaging in said guideways, and means to lock said track members in adjusted positions.

5. A vehicle seat structure comprising laterally spaced movable track members supporting the seat, said track members having forwardly disposed inclined track portions and rearwardly disposed inclined track portions, said forward and rearward track portions having different inclinations to the horizontal to provide for tilting of the seat, stationary supports for said track members, rotatable gears supported by said stationary supports and arranged to mesh with said track portions, forward and rearward guide slots in said track members and inclined respectively to substantially the same angle as said forwardly and rearwardly disposed track portions, rollers carried by said stationary supports and engaging in said slots, one of said stationary supports having a plurality of spaced notches, and latch means carried by one of said track members and engageable in said notches to lock said track members in adjusted position.

6. A vehicle seat structure comprising laterally spaced movable track members supporting the seat, said track members having forwardly disposed inclined track portions and rearwardly disposed inclined track portions, said forward and rearward track portions having different inclinations to the horizontal to provide for tilting of the seat, stationary supports for said track members, rotatable gears supported by said stationary supports and arranged to mesh with said track portions, forward and rearward guide slots in said track members and inclined respectively to said forwardly and rearwardly disposed track portions, rollers carried by said stationary supports and engaging in said slots, one of said stationary supports having a plurality of spaced notches, latch means carried by one of said track members and engageable in said notches to lock said track members in adjusted position, and spring means urging said latch means to engage in said notches.

7. In a vehicle seat structure, a pair of laterally spaced track members having front and rear inclined track portions, front and rear shafts extending transversely between said track members, stationary support means on which said shafts are mounted, gears on said shafts meshing with cooperating means on said inclined track portions to movably support said track members, forward and rearward guide slots in and extending longitudinally of said track members, said slots respectively having the same inclination as said forward and rearward track portions, and rollers, on said shaft engaged in said slots.

REX C. JACOBS.